March 18, 1924.
D. W. TYRRELL
BATTERY
Filed Jan. 3, 1921
1,487,494
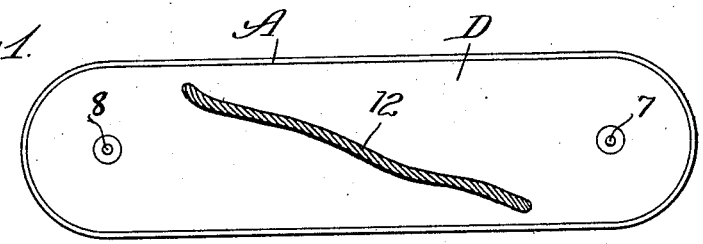
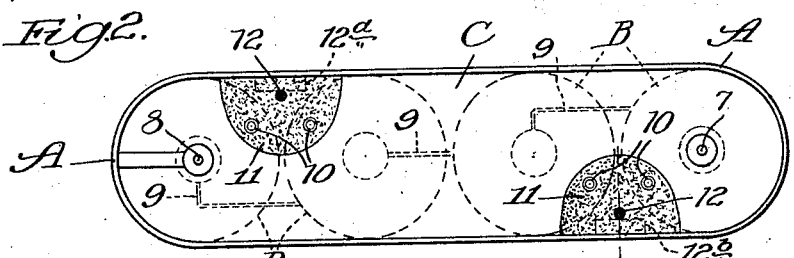
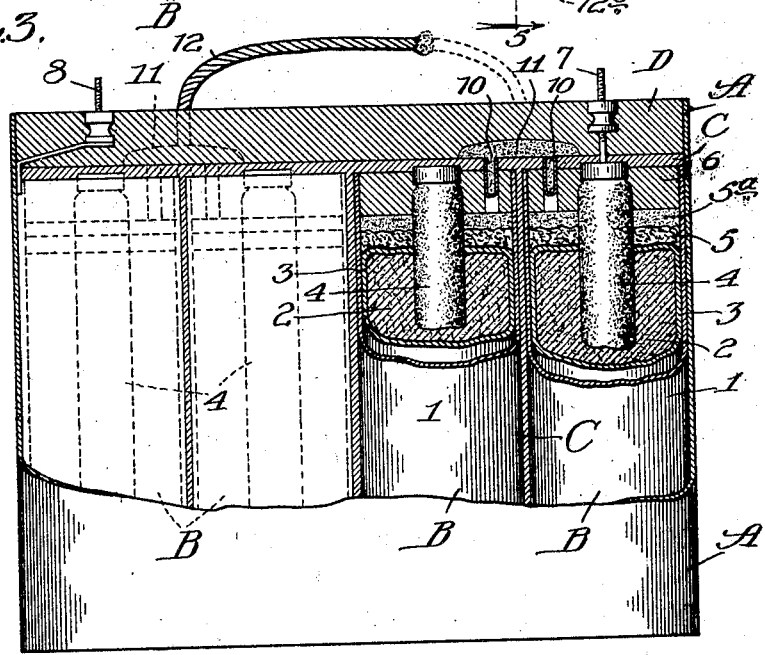
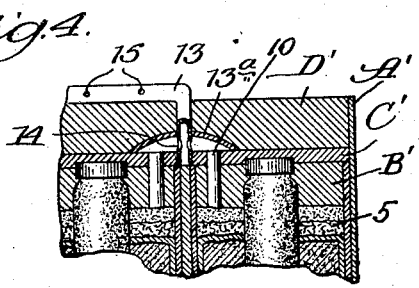
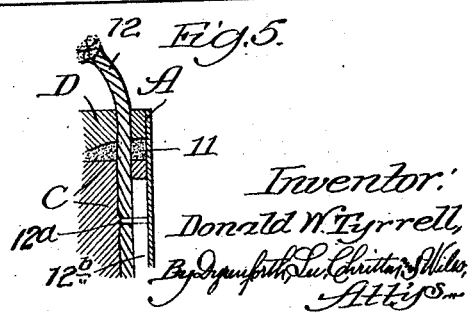
Inventor:
Donald W. Tyrrell, Patented Mar. 18, 1924.

1,487,494

UNITED STATES PATENT OFFICE.

DONALD W. TYRRELL, OF MADISON, WISCONSIN, ASSIGNOR TO FRENCH BATTERY & CARBON CO., OF MADISON, WISCONSIN, A CORPORATION OF WISCONSIN.

BATTERY.

Application filed January 3, 1921. Serial No. 434,682.

*To all whom it may concern:*

Be it known that I, DONALD W. TYRRELL, a citizen of the United States, residing at Madison, in the county of Dane and State of Wisconsin, have invented a new and useful Improvement in Batteries, of which the following is a specification.

The present invention relates particularly to batteries comprising a plurality of dry cells permanently housed together in a common container; and the primary object is to provide a battery of this character having suitable venting means, in order that the gases generated by the chemicals during operation of the battery, or while the battery is standing without delivering current, may escape and thus avoid injury to or bulging of the seal of the battery.

The invention is illustrated, in its preferred embodiment, in the accompanying drawing, in which—

Fig. 1 represents a plan view of a battery embodying the invention; Fig. 2, a plan view of the same with the upper seal or layer of pitch removed; Fig. 3, a vertical sectional view of the battery, the wall of the main container being shown broken away; Fig. 4, a broken sectional view, showing a modification; and Fig. 5, a broken sectional view, taken as indicated at line 5 of Fig. 2.

Referring to Figs. 1 to 3, inclusive, A represents a main container; B, a plurality of dry cells in the container A; C, a comparatively thin layer of pitch or other suitable sealing material disposed above the cells and forming a common seal therefor, this material also filling the spaces between the zinc cans; and D, a top layer of pitch, or other suitable sealing material, forming a top seal for the main container.

In the illustration given, each of the cells B comprises a zinc container 1; a core of depolarizing material 2 encircled by a cardboard shell 3, containing electrolyte; a carbon-pole 4 which rises to the level of the top of the zinc container 1; a layer of sawdust 5 and a layer of sand 5ª disposed above the active material of the cell; and an individual seal 6 disposed above the layer of granular or porous material 5ª, the seal 6 being composed of pitch or other suitable sealing material. The upper margin of the bibulous lining or card-board shell 3 is bent inwardly over the core of depolarizing material 2, and serves as a separator between the core and the layer of sawdust 5.

One of the carbons 4 is shown equipped with a terminal 7 which extends above the top seal D of the battery, and one of the zincs of the battery is shown equipped with a terminal 8 which has its base portion embedded in the seal D. The batteries are connected in series by suitable means, as by means of wires 9 indicated by dotted lines in Fig. 2. Through the individual seals 6 of the cells and through the common seal C extend vent passages 10. These passages, in the illustration given, are grouped close together in pairs and communicate with a layer of sand 11. The passages 10 are also filled with sand. Through the layers of sand 11 extend the end portions of a heavy cord, or small rope 12, the ends of which are anchored in the sealing layer C. The cord 12 may be formed of yarn, cotton, manila, or other substance, through which gases may pass to reach the external atmosphere. The cord 12 preferably has its end-portions secured, as by staples 12ª, to wooden strips, or posts, 12ᵇ, which are disposed in the vertical spaces between the zinc cans and embedded in the pitch C which fills said spaces.

It now will be understood that gases generated by the active material of the cells will pass into the granular or porous layers 5 and 5ª, thence through the passages 10 to the granular or porous layers 11, and thence through the cellular or porous material of the cord 12 to the external atmosphere. Any suitable porous or granular material may replace the layers 5 and 11, and any suitable passages from the layers 5 to the layers 11 may be employed.

In the modification shown in Fig. 4, A' represents the main container and B', B' represent cells. In this case, the battery is provided with a common seal C' for the cells and a top seal D' which fills the upper portion of the main container. A small tube 13 takes the place of the cord 12. This tube has its end portions anchored in the sealing layer C' and is equipped above the seal C' with inverted bells 13ª. Passages 10 lead from the layers 5 of porous material to the interior of the bell 13ª, and the end portions of the tube 13 communicate with the interior of the bell through passages 14. Above the seal D' the tube 13 is provided with perforations 15, which permit the escape of gases to the external atmosphere.

The invention is particularly adapted to large batteries, or to batteries containing a plurality of cells. A battery constructed in accordance with the invention will retain its original form, and will not have its seal bulged or injured as the result of the pressure of gases generated in the cells. By providing for the escape of gases as they are generated, bulging of the seal is obviated and the battery is maintained in the best condition for proper operation. The improvement tends to lengthen the life of the battery and prevent deterioration.

The means shown for permitting the escape of gases from the individual cells through the common container to the external atmosphere is preferred, but the invention is not to be understood as limited to the details shown.

The spaces between the individual cells of the battery are filled with pitch C, as indicated in Figs. 2 and 5, or the cells are otherwise suitably insulated from each other and from the main casing, if the main casing be of metal. If the main casing be of pasteboard, or the like, no further insulation is required between the cells and the wall of the main casing. The cord 12 may be formed of material ordinarily employed for making wicks, and the end portions of the cord which extend through the seal D may be regarded as wicks, adapted to permit the passage of gases. These wicks, while of a character to permit such passage of gases as may be required, will nevertheless serves to prevent escape of the sand 11 from the battery. It will be understood, of course, that the cord, where it passes through the seal D, is anchored in the seal, the pitch being poured in to form the seal, while the intermediate portion of the cord is held up by its own stiffness to prevent it from being embedded in the seal. The cord is sufficiently heavy and strong to afford a loop-form handle, by means of which the battery may be lifted and carried.

The foregoing description has been given for clearness of understanding only, and no unnecessary limitations should be understood therefrom, but the appended claims should be construed as broadly as permissible in view of the prior art.

What I regard as new, and desire to secure by Letters Patent, is—

1. A battery comprising a main container, a plurality of dry cells therein provided with cores of depolarizing material and electrolyte surrounding said cores, layers of inert material in said cells above said cores and electrolyte, individual seals in said cells, a common seal in said main container above and completely covering said cells, passages extending thru said seals and communcating with said layers of inert material, an upper seal in said main container, and venting means extending thru said upper seal and communicating with said passages, whereby the gases generated in said cells may pass to the external atmosphere.

2. A battery comprising a main container, a plurality of dry cells in said container, each comprising a zinc can, a depolarizing core in said can, and a layer of inert granular material supported on and covering the core, a seal in the upper portion of each can, a seal in the upper portion of said container, and wicks extending into said last named seal and communicating with said layers of inert material.

3. A battery comprising a main container, a plurality of dry cells therein, each of said cells having a core of depolarizing material and a bibulous envelope and electrolyte associated with said core, a layer of inert material above and supported on the core and envelope in each cell, said layer having interstices for the passage of gases, an individual seal in each cell above the layer of inert material, a common seal for said cells, passages extending thru said seals, layers of inert material above said seals with which the upper ends of said passages communicate, an outer seal in the upper portion of the main container, and means for conducting gases from said last-mentioned layers of inert material through said outer seal to the external atmosphere.

4. A battery comprising a main container, a plurality of dry cells therein, each of said cells having a core of depolarizing material and a paper wrapping containing electrolyte and enveloping said core, a layer of inert material above the core and paper wrapping in each cell, said layer having interstices for the passage of gases, an individual seal in each sell above the layer of inert material, a common seal for said cells, passages extending thru said seals, layers of inert material above said seals with which the upper end of said passages communicate, an outer seal in the upper portion of the main container, and wicks extending thru said outer seal and having their inner end portions extending into said last-mentioned layers of inert material.

5. A battery comprising a main container, a plurality of dry cells therein, each of said cells having a core of depolarizing material and electrolyte associated with said core, a layer of inert material above the core and electrolyte in each cell, said layer having interstices for the passage of gases, an individual seal in each cell above the layer of inert material, a common seal for said cells, passages extending thru said seals, layers of inert material above said seals with which the upper end of said passages communicate, an outer seal in the upper portion of the main container, and a cord having its end portions extending through the outer seal and anchored in the first-mentioned common seal, the end portions of said cord extending thru said last-mentioned layers of inert material.

6. A battery comprising a main container, a plurality of dry cells therein, provided above the active material with layers of granular material and above said layers of granular material with individual seals, passages extending through said individual seals, said passages being grouped in pairs, layers of granular material above said passages and filling said passages, a seal filling the upper end of the main container, and cord members extending thru said last-mentioned seal and extending into said last-mentioned layers of granular material.

7. A battery comprising a main container, a plurality of dry cells therein, sealing material in the upper portion of said container and in the spaces between said dry cells, a rope having end portions extending into spaces between said cells and anchored in the sealing material, and means for permitting the passage of gases from the active material of said cells to portions of the rope, whence said gases may escape through the rope to the external atmosphere.

DONALD W. TYRRELL.